(12) United States Patent
Zheng et al.

(10) Patent No.: US 10,473,287 B2
(45) Date of Patent: Nov. 12, 2019

(54) UNIVERSAL DAYTIME RUNNING LAMP FOR AUTOMOTIVE VEHICLES

(71) Applicant: KONINKLIJKE PHILIPS N.V., Eindhoven (NL)

(72) Inventors: Hua Bing Zheng, Seoul (KR); Albrecht Johannes Kraus, Shanghai (CN); Matthias Daniel Epmeier, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/044,169

(22) Filed: Jul. 24, 2018

(65) Prior Publication Data
US 2018/0328559 A1 Nov. 15, 2018

Related U.S. Application Data

(63) Continuation of application No. 14/910,194, filed as application No. PCT/EP2014/066368 on Jul. 30, 2014, now Pat. No. 10,060,593.

(30) Foreign Application Priority Data

Aug. 8, 2013 (EP) .................................. 13179726

(51) Int. Cl.
*F21S 41/30* (2018.01)
*B60Q 1/00* (2006.01)
(Continued)

(52) U.S. Cl.
CPC ............ *F21S 41/30* (2018.01); *B60Q 1/0035* (2013.01); *B60Q 1/18* (2013.01); *F21S 41/336* (2018.01);
(Continued)

(58) Field of Classification Search
CPC .... B60Q 1/0035; B60Q 1/18; B60Q 2400/30; B60Q 2900/10; F21S 41/30; F21S 41/336; F21S 43/14; F21S 43/19; F21S 43/31
See application file for complete search history.

(56) References Cited

U.S. PATENT DOCUMENTS

| 4,704,661 A | 11/1987 | Kosmatka |
| 6,257,737 B1 | 7/2001 | Marshall et al. |

(Continued)

FOREIGN PATENT DOCUMENTS

| CN | 102691960 A | 9/2012 |
| DE | 20102587 U1 | 5/2001 |

(Continued)

OTHER PUBLICATIONS

CN First Office Action dated May 22, 2017, China Patent Application No. 201480044355.9, LUM Reference No. 2013P00895WOCN, 17 pages.

(Continued)

*Primary Examiner* — Tsion Tumebo
(74) *Attorney, Agent, or Firm* — Patent Law Group LLP; Brian D. Ogonowsky

(57) ABSTRACT

A daytime running lamp for being retrofitted on a road vehicle, comprising a reflector with a reflective surface for reflecting light in a general direction of illumination and a plurality of light sources arranged in a pattern having an extension along a horizontal axis. The light emitted by the plurality of light sources has directional components in two opposite horizontal directions along the horizontal axis and a directional component in a vertical direction perpendicular to the horizontal axis. The reflective surface has a curvature such that the directional component in the vertical direction is directed towards the general direction of illumination, and the directional component in at least one of the horizontal (Continued)

directions upon reflection in the reflective surface is substantially unchanged by the reflection.

13 Claims, 3 Drawing Sheets

(51) Int. Cl.
 *B60Q 1/18* (2006.01)
 *F21S 43/19* (2018.01)
 *F21S 43/14* (2018.01)
 *F21S 43/31* (2018.01)
 *F21S 41/33* (2018.01)

(52) U.S. Cl.
 CPC .............. *F21S 43/14* (2018.01); *F21S 43/19* (2018.01); *F21S 43/31* (2018.01); *B60Q 2400/30* (2013.01); *B60Q 2900/10* (2013.01)

(56) References Cited

U.S. PATENT DOCUMENTS

| | | |
|---|---|---|
| 6,805,476 B2 | 10/2004 | Amano |
| 6,945,672 B2 | 9/2005 | Du et al. |
| 2002/0118548 A1 | 8/2002 | Kuenstler et al. |
| 2003/0035299 A1 | 2/2003 | Amano |
| 2005/0041436 A1 | 2/2005 | Ishida |
| 2005/0180158 A1 | 8/2005 | Komatsu |
| 2006/0170379 A1 | 8/2006 | Uchida |
| 2007/0165416 A1 | 7/2007 | Ishida et al. |
| 2009/0168446 A1 | 7/2009 | Okada |
| 2013/0094209 A1 | 4/2013 | Yu |
| 2013/0135889 A1 | 5/2013 | Okubo |
| 2013/0343075 A1 | 12/2013 | Schirmer et al. |
| 2015/0062948 A1 | 3/2015 | Otsubo |
| 2016/0084465 A1 | 3/2016 | Yamamoto |

FOREIGN PATENT DOCUMENTS

| | | |
|---|---|---|
| DE | 102004038065 A1 | 3/2005 |
| DE | 102005005860 A1 | 8/2005 |
| DE | 102009009765 A1 | 8/2010 |
| DE | 102009052321 A1 | 5/2011 |
| DE | 102010020616 A1 | 11/2011 |
| EP | 2045514 A1 | 4/2009 |
| EP | 2058585 A2 | 5/2009 |
| JP | 1021704 A | 1/1998 |
| JP | 2003100116 A | 4/2003 |
| JP | 2005056704 A | 3/2005 |
| JP | 2007188736 A | 7/2007 |
| JP | 2009054392A A | 3/2009 |
| KR | 465953 Y1 | 3/2013 |

OTHER PUBLICATIONS

Derwent English Excerpts for KR0465953Y1, 2 pages.
EPC Article 94(3) dated Nov. 10, 2016, European Application No. 14748155.0, LUM Reference No. 2013P00895WE, 6 pages.
EPO as ISA, PCT/EP2014/066368, filed Jul. 30, 2014, "International Search Report and Written Opinion" dated Oct. 23, 2014, 10 pages.
Extended European Search Report dated Dec. 13, 2016 from European Patent Application No. 13179726.8, 7 pages.
First Office Action dated Jan. 30, 2018, Japanese Patent Application No. 2016-532321, 6 pages.
Second Office Action dated Oct. 20, 2017, China Patent Application No. 201480044355.9, 7 pages.

UNIVERSAL DAYTIME RUNNING LAMP FOR AUTOMOTIVE VEHICLES

CROSS-REFERENCE TO RELATED APPLICATIONS

The present application is a continuation of U.S. application Ser. No. 14/910,194, filed Feb. 4, 2016, entitled "UNIVERSAL DAYTIME RUNNING LAMP FOR AUTOMOTIVE VEHICLES", which is a § 371 application of International Application No. PCT/EP2014/066368 filed on Jul. 30, 2014, which claims the benefit of European Application No. 13179726.8, filed Aug. 8, 2013. U.S. application Ser. No. 14/910,194, International Application No. PCT/EP2014/066368 and European Application No. 13179726.8 are incorporated herein.

FIELD OF THE INVENTION

The present disclosure relates to a daytime running lamp (DRL). More specifically, it relates to a DRL for being retrofitted on a road vehicle.

BACKGROUND OF THE INVENTION

A DRL is a lighting device for use during daylight conditions in order to improve road safety by increasing the visibility of a road vehicle to other motorists and pedestrians. Typically, the lamps are positioned on the front of the vehicle, either integrated with the headlights or separate, and emit a white or yellow light when the ignition is activated. Solid-state lighting (SSL) devices, such as light-emitting diodes, are increasingly being used with DRLs because of their low power consumption, long lifetime and reliability.

KR465953Y1 discloses a daytime running lamp with light-emitting diodes arranged above pocket-shaped reflecting bodies for directing the light emitted by the light-emitting diodes in the direction of forward motion of the vehicle.

There exist DRLs for retrofitting on vehicles not equipped with such lamps at the time of production. It is desirable that these DRLs be possible to mount on a wide range of vehicles and meet many different national regulations governing the use of DRLs. It is possible to improve existing DRLs for retrofitting in these respects.

US2006/0170379 discloses a vehicle headlamp with a plurality of light sources and a reflector. The reflector has a cylindrical shape with a parabolic cross section in vertical direction. In horizontal direction the cylindrical shape is straight. The reflector forms a light beam in the general direction of illumination. The beam is diffused to the right and the left in a horizontal plane. This headlamp is less suitable for application as a DRL lamp, in particular for retrofit application. The vehicle-mounted DRL may provide too much light sideways relative to the vehicle and requires a relatively large number of light sources.

SUMMARY OF THE INVENTION

The general objective of the present disclosure is to provide an improved or alternative DRL for retrofitting on a vehicle. Specific objectives include the provision of a DRL producing a type of illumination that allows for a high degree of mounting flexibility.

The invention is defined by the independent claims. Embodiments are set forth in the dependent claims, the description and the drawings.

According to a first aspect, there is provided a DRL for being retrofitted on a road vehicle. The daytime running lamp comprises a reflector with a reflective surface for reflecting light in a general direction of illumination and a plurality of light sources arranged in a pattern which has an extension along a horizontal axis and being arranged to emit light onto the reflective surface. The light emitted by the plurality of light sources has directional components in two opposite horizontal directions along the horizontal axis and a directional component in a vertical direction perpendicular to the horizontal axis. The reflective surface has a curvature such that the directional component in the vertical direction upon reflection in the reflective surface is directed towards the general direction of illumination. The curvature is also such that the directional component in at least one of the horizontal directions upon reflection in the reflective surface is substantially unchanged by the reflection.

By "general direction of illumination" is meant the direction in which most of the light emanating from the DRL is directed according to an observer. Typically, the light will have a certain distribution around this direction. By a directional component being "maintained" is meant that the directional component changes by less than 10%, alternatively less than 5%, or 0%.

The expression that the light sources are arranged "in a pattern which has an extension along a horizontal axis" does not restrict the invention to a design having light sources in a straight line. The light sources can for example be arranged in a zig-zag pattern or be arranged along a slightly curved line.

Since the curvature is such that the directional component in at least one of the horizontal directions upon reflection in the reflective surface is substantially unchanged by the reflection, the DRL produces a broad light beam in a plane approximately perpendicular to the vertical direction. A broad light beam can result in a high degree of mounting flexibility of the DRL because the DRL is more likely to provide the regulatory-required illumination regardless of the position of the DRL on the vehicle onto which it is mounted. For example, the vehicle-mounted DRL may have to be inclined according to the shape of the vehicle in such a way that the general direction of illumination of the DRL and the direction of forward motion of the vehicle differ quite significantly. In such a situation, the broad light beam provided by the DRL as described above can result in an increased probability that the zone illuminated by the DRL covers the zone required by regulations.

According to one embodiment, the curvature can be such that the directional components in both of the horizontal directions upon reflection in the reflective surface are substantially unchanged by the reflection. By this construction, the light beam produced by the DRL can cover about 90 degrees in a plane approximately perpendicular to the vertical direction. By this construction, the general direction of illumination is typically approximately perpendicular to the horizontal directions.

According to an alternative embodiment, the curvature can be such that the directional component in one of the horizontal directions upon reflection in the reflective surface is directed towards the general direction of illumination. In this alternative embodiment, the general direction of illumination can form an acute angle with one of the opposite horizontal directions, and the light beam produced by the DRL can cover about 45 degrees in a plane approximately perpendicular to the vertical direction. This alternative embodiment can be particularly suitable for some vehicles, for example vehicles whose shape requires the DRL to be mounted in such a way that a DRL, whose general direction of illumination is perpendicular to the horizontal directions and whose light beam covers about 90 degrees, would provide too much light sideways relative to the vehicle. Moreover, a DRL whose light beam covers an angle of about 45 degrees may require fewer or smaller light sources, whereby production costs can be reduced. The use of fewer SSL devices may also reduce production costs insofar as it may lead to the DRL generating less heat and, consequently, allow for cheaper and/or less production materials to be used.

Another example of a DRL whose light beam can cover an angle of about 45 degrees in a plane approximately perpendicular to the vertical direction is a DRL having additional reflectors, each of which is arranged to direct light from one light source of the plurality of light sources towards the general direction of illumination before the light is reflected by the reflective surface. Yet another example is a DRL whose light sources are arranged at an angle with respect to the horizontal axis.

The cross-section of the reflector in a plane perpendicular to the horizontal axis can present at least two sections. A section can be straight or curved. A section can be concave, convex, elliptical or parabolical. A section can have the shape of a free-form curve.

The reflector can be extruded, for example by hot extrusion, cold extrusion or warm extrusion. The reflector can be extruded in its longitudinal direction, i.e. in a direction parallel to the axis A. Extrusion is an efficient method for producing reflectors with complex cross-sections. In the simplest case, the extrusion path is straight, but also a curved extrusion path may be envisaged.

The reflector can be made of a material chosen from the group consisting of PMMA, polycarbonate and aluminum. The reflective surface can be formed by the extruded material, or it can be a coating. The coating material can be aluminum or silver, for example. Using these reflectors and coating materials can facilitate the provision of reflectors having appropriate shapes and desirable reflective properties.

The horizontal distance between two neighboring light sources of the plurality of light sources can be less than about twice the size of the reflector in the vertical direction. This arrangement can result in a more homogenous and pleasant light beam.

The plurality of light sources can be arranged on a printed circuit board (PCB). A PCB is a device frequently used for mechanically supporting and electrically connecting light sources and is particularly suitable for the present invention. The light sources can be of the same type or of different types, and the light emitted by the light sources can have the same color or different colors. The color of the light emitted by a light source can be white or yellow. Each of the plurality of light sources can be an SSL device, such as a semiconductor light-emitting diode, an organic light-emitting diode, a polymer light-emitting diode or a laser diode. SSL devices are energy efficient and have a long lifetime and are suitable for DLRs.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the Figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
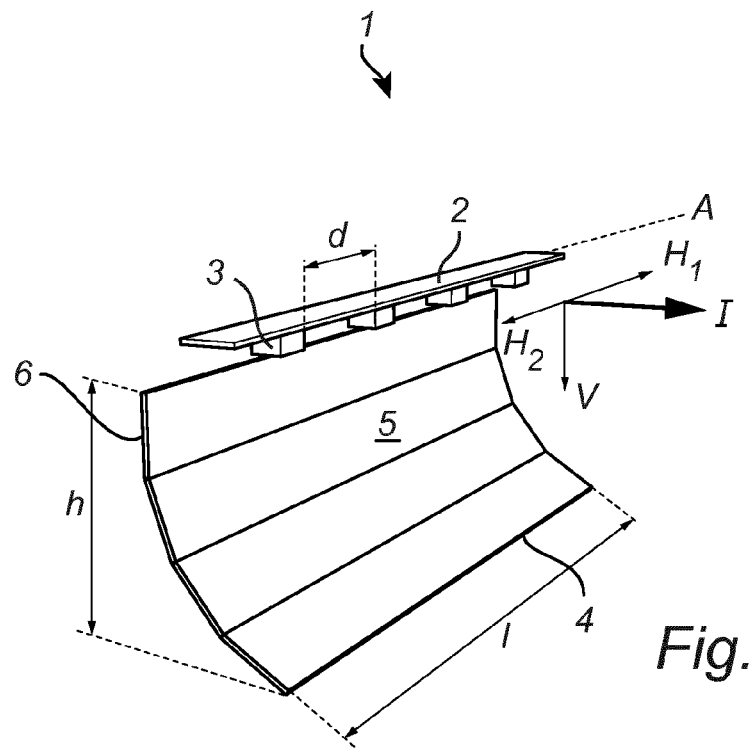
FIG. 1 is a perspective view of a DRL having a straight reflector.

The DRL 1 shown schematically in FIG. 1 has a PCB 2 which provides electrical circuitry for a plurality of light sources 3 in the form of SSL devices, such as semiconductor light-emitting diodes, organic light-emitting diodes, polymer light-emitting diodes and laser diodes. The SSL devices 3 are arranged on the PCB 2 along the horizontal axis A which defines two opposite horizontal directions $H_1$, $H_2$. The horizontal distance d between neighboring SSL devices 3 is typically constant but can vary. The general construction of a PCB with SSL devices is deemed to be known to the skilled person and will therefore not be further described.

The SSL devices 3 are arranged to emit light onto a reflector 4 with a reflective surface 5. The reflector 4 has two opposing edges which are parallel with the horizontal axis A. The reflector 4 has a horizontal length l and a height h in a vertical direction V which is perpendicular to the horizontal directions $H_1$, $H_2$. The vertical height h of the reflector 4 can be more than about half the horizontal distance d between two neighboring SSL devices 3. The reflector 4 can be extruded, for example by hot extrusion, cold extrusion or warm extrusion.

In FIG. 1, the cross-section of the reflector 4 in a plane perpendicular to the horizontal axis A can be constant along the horizontal axis A, but it is conceivable that the cross-section varies along the horizontal axis A. Furthermore, the cross-section of the reflector 4 in a plane perpendicular to the horizontal axis A can present at least two sections 6. The reflector 4 in FIG. 1 has four such sections 6, each of which is straight. In general, however, a section 6 can have any desirable shape, such as an elliptical or a parabolical shape. The shape of a section 6 can be that of a free-form curve. A section 6 can be concave or convex. The sections 6 can have the same shape or different shapes.

The reflecting surface 5 can be straight in the horizontal directions $H_1$, $H_2$, as in FIG. 1. Alternatively, the reflective surface 5 can be slightly curved in the horizontal directions $H_1$, $H_2$. By "slightly" is here meant that the curvature is small enough to allow for the horizontal directional components of the light emitted by the SSL devices 3 upon reflection in the reflective surface 5 to be substantially unchanged by the reflection. For example, the reflective surface 5 can present adjacent portions which are, in the horizontal directions $H_1$, $H_2$, slightly concave, slightly convex, slightly spheroidal, slightly ellipsoidal, slightly paraboloidal or slightly curved according to a free-form surface. A slightly curved reflective 5 surface can result in a more homogenous and pleasant light beam. Moreover, this construction can be a simple way to ensure that the light beam provided by the DRL 1 meets certain regulatory requirements.

The light emitted by the DRL 1 defines a general direction I of illumination. The light beam of the DRL 1 according to FIG. 1 has a general direction I of illumination which is approximately perpendicular to the horizontal directions $H_1$, $H_2$ as well as the vertical direction V, and the light beam covers about 90 degrees in a plane approximately perpendicular to the vertical direction V.

Figure 2:
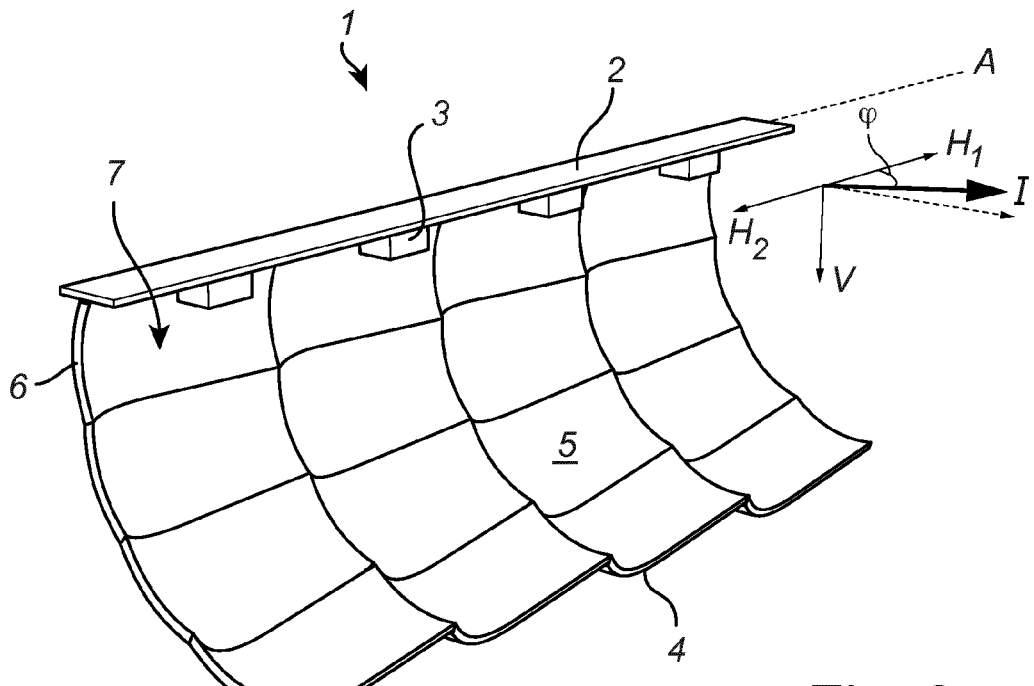
FIG. 2 is a perspective view of a DRL having an asymmetrically curved reflector.

The DRL 1 illustrated in FIG. 2 is similar to that illustrated in FIG. 1. In FIG. 2, however, the DRL 1 has a reflector 4 with a reflective surface 5 that is asymmetrically curved in the horizontal directions $H_1$, $H_2$. To be more precise, the reflective surface 5 of the reflector 4 has adjacent portions 7 which are asymmetrically curved in the horizontal directions $H_1$, $H_2$. Such portions 7 can be similarly or differently curved. This construction can result in the general direction I of illumination forming an acute angle φ with one of the horizontal directions $H_1$, $H_2$. In FIG. 2, the general direction I of illumination forms an acute angle φ with the horizontal direction $H_1$. The angle φ can be, for example, about 45 degrees, alternatively about 30 degrees or about 20 degrees. The light beam produced by the DRL 1 according FIG. 2 can cover about 45 degrees in a plane approximately perpendicular to the vertical direction V.

The reflector 4 in FIG. 2 has a curved cross-section in a plane perpendicular to the horizontal axis A. The cross-section has four curved sections 6. A curved section 6 can have any desirable shape, such as that of a free-form curve. A curved section 6 can have an elliptical or a parabolical shape. A section 6 can be concave or convex. The curved sections 6 can have the same shape or different shapes.

Figure 3:
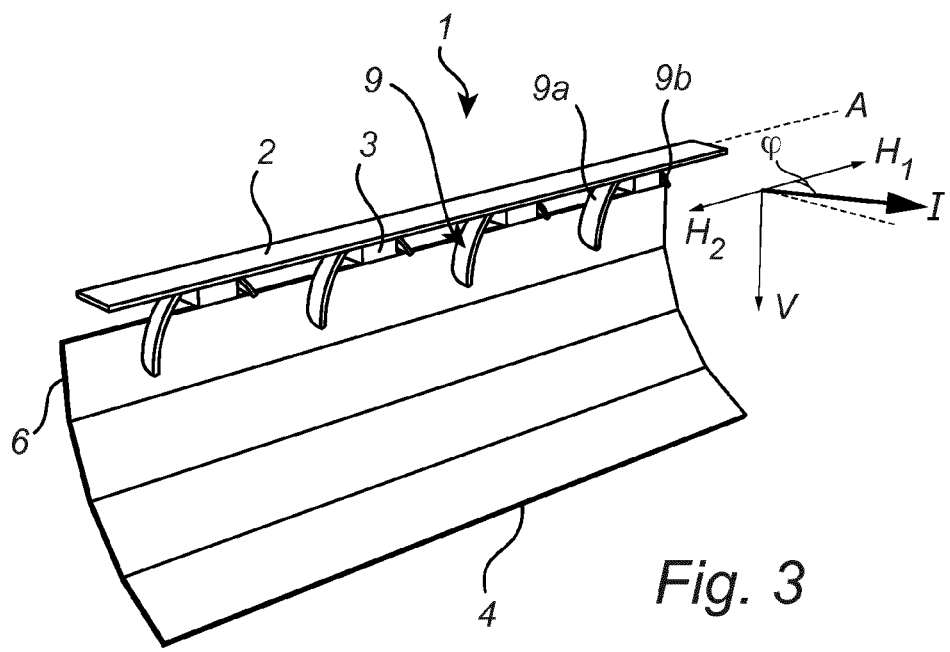
FIG. 3 is a perspective view of a DRL having additional reflectors.

FIG. 3 shows a DRL 1 having additional reflectors 9 positioned by the SSL devices 3. Each additional reflector 9 is arranged to reflect the light emitted by an SSL device 3 towards the general direction I of illumination before the light is reflected by the reflector 4. All of the additional reflectors 9 can be arranged to reflect light to the same side. The use of additional reflectors 9 can result in the general direction I of illumination forming an acute angle φ with one of the horizontal directions $H_1$, $H_2$. In FIG. 3, the general direction I of illumination forms an acute angle φ with the horizontal direction $H_1$. The angle φ can be, for example, about 45 degrees, alternatively about 30 degrees or about 20 degrees. The light beam produced by the DRL 1 according FIG. 3 can cover about 45 degrees in a plane in a plane approximately perpendicular to the vertical direction V.

In FIG. 3, each additional reflector 9 has two portions 9a, 9b arranged on different sides of a respective SSL device 3. Each additional reflector 9 can, however, have only one portion 9a, 9b arranged on one side of a respective SSL device 3.

Figure 4:
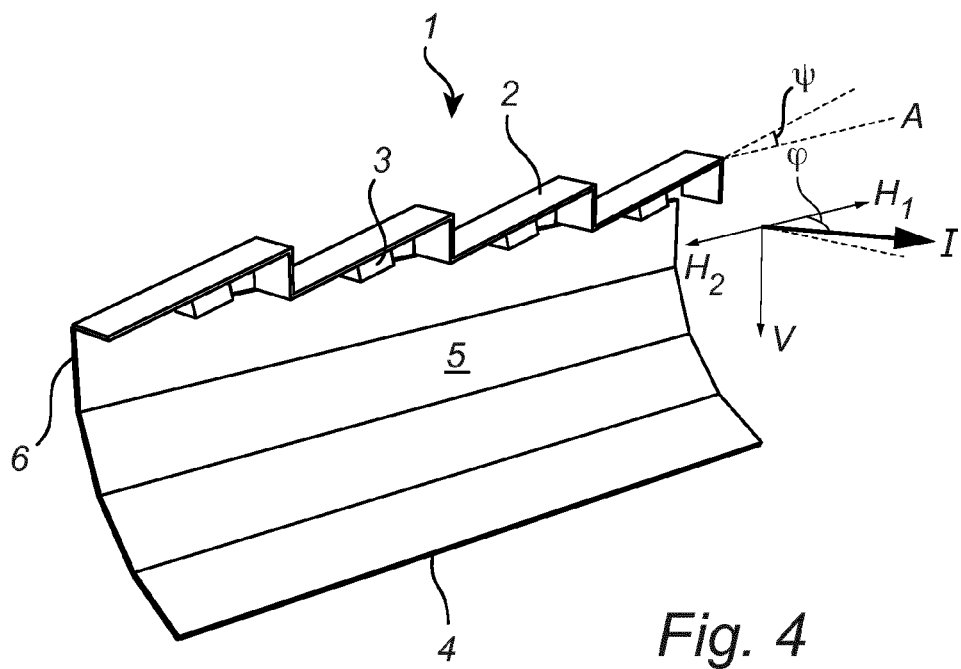
FIG. 4 is a perspective view of a reflector having inclined SSL devices.

FIG. 4 shows a DRL 1 with horizontally inclined SSL devices 3. Each SSL device 3 is arranged on the PCB 2 so that it forms an angle ψ with respect to the horizontal axis A. This construction can result in the general direction I of illumination forming an acute angle φ with one of the horizontal directions $H_1$, $H_2$. In FIG. 2, the general direction I of illumination forms an acute angle φ with the horizontal direction $H_1$. The angle φ can be, for example, about 45 degrees, alternatively about 30 degrees or about 20 degrees. The light beam produced by the DRL 1 according FIG. 4 can cover about 45 degrees in a plane approximately perpendicular to the vertical direction V.

In use, the light emitted by the SSL devices 3 has a directional component in the vertical direction V so that it strikes the reflective surface 5 of the reflector 4. The light emitted by the SSL devices 3 also has directional components in the horizontal directions $H_1$, $H_2$. The reflector 4 reflects the light in the general direction I of illumination. Since the reflective surface 5 is straight, or only slightly curved, in the horizontal directions $H_1$, $H_2$, at least one of the horizontal directional components of the light reflected by the reflector 4 is substantially unchanged by the reflection. This may result in a broad light beam.

Figure 5:
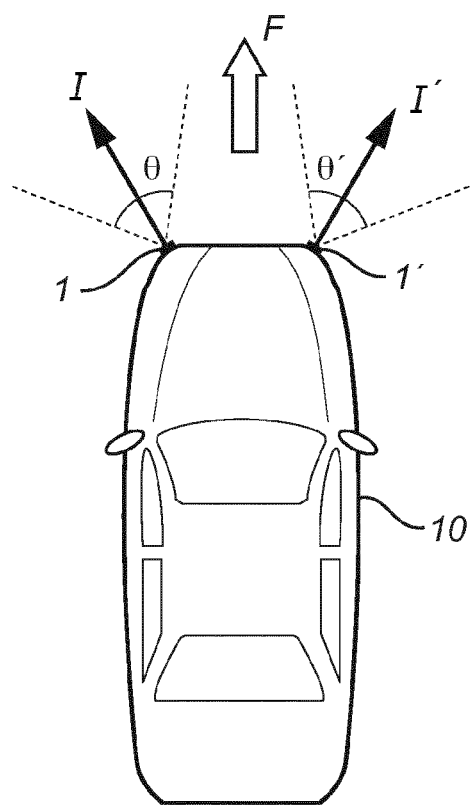
FIG. 5 is a top plan view of a car equipped with two DRLs.

FIG. 5 shows two spaced-apart DRLs 1, 1' mounted on the front of a vehicle 10, in the form of a car, so that one of them is positioned to the left and the other one to the right relative to a driver of the car 10. Each DRL 1, 1' can be mounted near a headlight of the car 10. A DRL 1, 1' can be integrated with a headlight case. The vehicle-mounted DRLs 1, 1' may be inclined according to the shape of the front of the car 10. The horizontal axis A of the DRL 1 can be approximately parallel with the ground, and the vertical direction V of the DRL 1 can be approximately perpendicular to the ground. The DRL 1' is typically similarly arranged with respect to the ground.

As is illustrated in FIG. 5, the general directions I, I' of illumination of the vehicle-mounted DRLs 1, 1' do not coincide with the direction F of forward motion of the car 10. In general, however, these directions may coincide. The light beam emitted by the DLR 1 covers an angle θ in a plane approximately perpendicular to the vertical direction V of the DLR 1. Similarly, the light beam emitted by the DLR 1' covers an angle of θ'. The angles θ, θ' are typically equal, but do not have to be equal.

According to one embodiment, the angles θ, θ' can be about 90 degrees. The fact that the light beams emitted by the DRLs 1, 1' are broad increases the probability that the illumination provided by the DRLs 1, 1' fulfills any regulatory requirements even if the inclinations of the DRLs 1, 1' result in the general directions I, I' of illumination not coinciding with the direction F.

According to another embodiment, which may be preferred if the vehicle-mounted DLRs 1, 1' are very sharply inclined relative to the direction F, the angles θ, θ' can be about 45 degrees. In this embodiment, the general direction I of illumination of the DRL 1 forms an acute angle φ with one the horizontal directions $H_1$, $H_2$ of the DRL 1 in order to compensate for the inclination of the DLR 1 with respect to the direction F so that less light is emitted sideways relative to the vehicle. The general direction I' of illumination of the DRL 1' is similarly arranged.

The person skilled in the art realizes that the present invention by no means is limited to the preferred embodiments described above. On the contrary, many modifications and variations are possible within the scope of the appended claims. For example, the DRL 1 can be mounted on a vehicle so that the horizontal axis A is approximately perpendicular to the ground. In fact, the DRL 1 can be mounted so that the horizontal axis A makes any desirable angle with the ground.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lamp for a road vehicle, comprising:
a reflector with a reflective surface for reflecting light in a general direction of illumination, the reflector comprising rectangular portions, each rectangular portion being curved, wherein edges of each rectangular portion are coupled to edges of adjacent rectangular portions to form an N×M matrix of the rectangular portions, where N and M are each greater than one,
wherein different rows of the rectangular portions are tilted at progressively different angles, and
wherein each reflector portion has a reflective surface that is asymmetrically curved, such that the general direction of illumination forms an acute angle with a first horizontal direction along the reflector; and
a plurality of light sources arranged in a pattern having an extension along a horizontal axis and being arranged to emit light onto the reflective surface, wherein light emitted by the plurality of light sources has directional components in two opposite horizontal directions along the horizontal axis and a directional component in a vertical direction perpendicular to the horizontal axis, wherein
the reflective surface reflects the directional component in the vertical direction of the emitted light towards the general direction of illumination.

2. The lamp of claim 1 wherein the rectangular portions comprise at least four rectangular portions along each of the rows.

3. The lamp of claim 1 wherein the rectangular portions are identical to each other.

4. The lamp of claim 1 wherein at least some of the rectangular portions are different from others of the rectangular portions.

5. The lamp of claim 1 wherein the rectangular portions are convex.

6. The lamp of claim 1 wherein the rectangular portions are concave.

7. The lamp of claim 1 wherein the rectangular portions are asymmetrically curved in the horizontal direction.

8. The lamp of claim 1 wherein the plurality of light sources emit light in a first horizontal direction and a second horizontal direction, wherein the general direction of illumination forms an acute angle with respect to the first horizontal direction.

9. The lamp of claim 8 wherein the acute angle is equal to or less than 45 degrees.

10. The lamp of claim 1 wherein the reflector portions are elliptically or parabolically curved.

11. The lamp of claim 1 wherein the plurality of light sources comprises a plurality of light emitting diodes.

12. The lamp of claim 1 wherein the reflective surface emits a light beam that is less than 90 degrees.

13. The lamp of claim 1 wherein the lamp is a daytime running lamp.

* * * * *